(12) United States Patent
Aslin

(10) Patent No.: US 7,772,294 B2
(45) Date of Patent: Aug. 10, 2010

(54) FIRE RESISTANT MATERIALS

(75) Inventor: David Charles Aslin, Ripley (GB)

(73) Assignee: Synbra Technology B.V. (NL)

( * ) Notice: Subject to any disclaimer, the term of this patent is extended or adjusted under 35 U.S.C. 154(b) by 1115 days.

(21) Appl. No.: 10/539,712

(22) PCT Filed: Nov. 27, 2003

(86) PCT No.: PCT/GB03/05204

§ 371 (c)(1),
(2), (4) Date: Feb. 22, 2006

(87) PCT Pub. No.: WO2004/055132

PCT Pub. Date: Jul. 1, 2004

(65) Prior Publication Data

US 2006/0175586 A1 Aug. 10, 2006

(30) Foreign Application Priority Data

Dec. 18, 2002 (EP) ................... 02258722

(51) Int. Cl.
C08J 9/236 (2006.01)
C08J 9/224 (2006.01)
C08J 9/228 (2006.01)
C09K 21/06 (2006.01)
C09K 21/14 (2006.01)
C08K 5/01 (2006.01)

(52) U.S. Cl. .............. 521/57; 521/56; 521/58; 521/60; 521/82; 521/92; 521/98; 252/606; 252/609; 523/179; 524/406; 524/431; 524/469; 524/464

(58) Field of Classification Search .................. 521/57
See application file for complete search history.

(56) References Cited

U.S. PATENT DOCUMENTS

| | | | | |
|---|---|---|---|---|
| 4,281,067 A | * | 7/1981 | Kienzle et al. | 521/56 |
| 6,087,447 A | * | 7/2000 | Stevens et al. | 525/211 |
| 6,130,265 A | * | 10/2000 | Glueck et al. | 521/56 |
| 6,384,094 B1 | * | 5/2002 | Gluck | 521/56 |
| 6,414,041 B1 | * | 7/2002 | Gluck | 521/56 |
| 6,444,714 B1 | * | 9/2002 | Gluck et al. | 521/56 |
| 7,128,973 B2 | * | 10/2006 | Park | 428/407 |
| 2002/0107315 A1 | * | 8/2002 | Chaudhary et al. | 524/371 |
| 2003/0073752 A1 | * | 4/2003 | Gabbard et al. | 521/57 |
| 2006/0189703 A1 | * | 8/2006 | Noordegraaf | 521/56 |
| 2007/0066693 A1 | * | 3/2007 | Bres et al. | 521/50 |
| 2008/0096988 A1 | * | 4/2008 | Hahn et al. | 521/56 |

FOREIGN PATENT DOCUMENTS

| | | |
|---|---|---|
| DE | 199 10 257 A | 9/2000 |
| DE | 101 01 432 A1 | 7/2002 |
| GB | 1588314 A | 4/1981 |
| JP | 3167237 A | 7/1991 |
| JP | 4356543 A | 12/1992 |

* cited by examiner

*Primary Examiner*—Joseph D Anthony
(74) *Attorney, Agent, or Firm*—Adams Intellectual Property Law

(57) ABSTRACT

A method for forming a fire resistant material is disclosed. The method comprises providing a plurality of expandable beads of a polymeric material. The beads are coated with an exfoliable graphite. The exfoliable graphite is adhered to the beads with a resin having a solubility parameter of the polymeric material. The beads are thereafter caused or allowed to expand and fuse.

12 Claims, No Drawings

FIRE RESISTANT MATERIALS

This is a national phase application of International Application PCT/GB03/005204, filed Nov. 27, 2003, and claims priority to United Kingdom Patent Application No. 02258722.4, filed Dec. 18, 2002. The present invention concerns the manufacture of fire resistant expanded polystyrene foams and composite panels constructed from such materials. These foams have a significantly reduced reaction to fire and retain a degree of integrity when exposed to fire regimes. These foams may be produced entirely within the manufacturing sequences and within the same equipment as are conventionally and commercially used for the production of expanded polystyrene (EPS).

Conventionally, expanded polystyrene foam in sheet form is used as an insulant in building construction and particularly as the core of insulating sandwich panels and walls, typically in refrigeration applications. The skins of such walls or panels are generally thin precoated steel. The structures may be assembled by the use of adhesives or mechanical fastenings or a combination of both. EPS sheet is is also used as thermal insulation in building construction.

The conventional process for the production of polystyrene foam sheet or forms is as follows:

(a) Unexpanded polystyrene bead is produced by a suspension polymerisation process and supplied from the manufacturer in granular form graded for particle size, the granules being approximately spherical. This granular polystyrene has a proportion of pentane dissolved in it which acts as the expanding or blowing agent.

(b) The bead is exposed to heat, usually by steam injected at the bottom of a tall column. As the beads pass from the bottom of the column to the top they soften and as the pentane is lost from solid solution, the released gas causes the softened polystyrene bead to expand up to fifty times the original volume. The expanded low density polystyrene bead is collected at the top of the expansion column.

(c) The expanded beads still contain a small amount of pentane after this primary expansion process. They are wet by virtue of the steam used in the primary expander and have a partial vacuum within the pores formed during the expansion in the bead. Conventionally, the freshly expanded beads are stored in hoppers and allowed to mature during which process the excess water is lost and the partial vacuum is equalised to atmospheric pressure.

(d) The matured, expanded beads are introduced into moulds which have their walls penetrated by many small apertures leading to plenum chambers behind each wall. The charge may be compressed. Steam is introduced into the vessel containing the expanded polystyrene bead at pressures not exceeding 1.5 bar. The polystyrene beads again soften and the residual pentane is released. In this second stage the volume expansion of the charge is contained by the mould walls forcing the beads together and fusing them to form a single light weight mass of expanded polystyrene foam.

(e) If the mould was in the form of a block, the blocks of expanded polystyrene are subsequently sliced into sheets, using hot wires. These slices are used as the cores of the insulating walls or panels mentioned above.

Polystyrene and exfoliable graphite resin have been previously combined to produce fire retardant EPS. It is known to incorporate exfoliable graphite in the initial synthesis procedure (a) above. However, this method limits and restricts the methods used in the polystyrene emulsion polymerisation procedure and process. Satisfactory practice of such procedures are subject to significant skill and know how. Incorporation of the additional materials such as exfoliable graphite at this stage is extremely limiting in the practice and flexibility of such processes. In this current invention no alteration or modification of the initial syntheses procedures are required.

The use of exfoliable graphite in applications where it is used to seal gaps in the event of fire is widely taught. The graphite is supported in a binder with or without other inorganic fillers or applied to a textile or felt. These applications are invariably limited to sealing small gaps such as occur around closures and to sealing, in the event of fire, the residual openings where penetrations exist around services such as pipes or where cables penetrate what would otherwise be an effective fire barrier installed to provide compartmentalisation.

The use of resin bound exfoliable graphite EPS to provide fire retardant compositions is also known. The resins disclosed as suitable for exfoliable graphite binders are acrylonitrile/butadiene, styrene butadiene, ethylene vinyl acetate, polyvinyl acetate, polyvinyl chloride and polyacrylate resins. These binders act as adequate adhesives for the exfoliable graphite. However, there are adverse effects on the physical properties of the polystyrene block and they no additional fire performance properties.

According to one aspect of this invention, there is provided a method of forming a fire resistant material comprising: providing a plurality of expandable beads of a polymeric material; coating said beads with an exfoliable graphite wherein the exfoliable graphite is adhered to the beads with a resin having a solubility parameter of within substantially 0.5 (cal cm$^{-3}$)$^{1/2}$ of the solubility parameter of the polymeric material; and thereafter causing or allowing said beads to expand and fuse.

According to another aspect of this invention, there is a fire resistant material comprising: a plurality of expanded and fused beads of a polymeric material, said beads being coated with an exfoliable graphite; and a resin to adhere the exfoliable graphite material to the beads, the resin having a solubility parameter of within substantially 0.5 (cal cm$^{-3}$)$^{1/2}$ of the solubility parameter of the polymeric material.

According to another aspect of this invention, there is provided a composition for forming a fire resistant material comprising a plurality of expandable beads of a polymeric material, said beads being coated with an exfoliable graphite, wherein the exfoliable graphite is adhered to the beads with a resin having a solubility parameter of substantially 0.5 (cal cm$^{-3}$)$^{1/2}$ of the solubility parameter of the polymeric material.

The polymeric material may comprise polystyrene. Preferably, said beads are formed into blocks by expansion in closed forms using steam.

The resin may comprise an emulsion comprising one or more of a styrene/acrylic copolymer, a styrene homopolymer, a vinyldene vinyl chloride copolymer, methylphenyl siloxane. The resin may include a halogenated flame retardant and may also include a synergist comprising an oxide of an element of group 6B of the periodic table. The halogenated flame retardant may comprise a brominated flame retardant. The flame retardant may comprise hexabromocyclododecane.

The synergist may comprise tungsten oxide, for example yellow tungsten oxide.

Preferably, the expandable beads comprise partially expanded polystyrene beads.

According to another aspect of this invention there is provided expanded polystyrene materials with enhanced fire performance properties produced by coating partially expanded EPS bead with exfoliable graphite using, as the adhesive, resins with a solubility parameter, δ of within 0.5 (cal cm$^{-3}$)$^{1/2}$ of polystyrene, these resins being used as emulsions applied to the expanded polystyrene bead, and the coated partially expanded polystyrene bead thereafter being formed into blocks by final expansion in closed forms using steam.

Preferably the resin is an emulsion of a styrene/acrylic copolymer, and/or a styrene homopolymer, and/or a vinylidene vinyl chloride copolymer and/or methyl phenyl siloxane.

The resin emulsion contains brominated flame retardants and synergists composed of oxides of the elements of group 6b of the periodic table The flame retardant is preferably HBCD.

The synergist may be yellow tungsten oxide.

According to another aspect of this invention, there is provided fire barriers composed of expanded polystyrene materials as described above, assembled between non flammable rigid outer skins where the expanded polystyrene contains sufficient exfoliable graphite to entirely fill the cavity between the skins left after the melting and loss of the polystyrene.

In the preferred embodiment of the present invention the above prior art process is modified by carrying out one of the following steps after the above steps (1) to (e), i.e. either:

(f) coating the unexpanded beads derived from the initial syntheses with a mixture containing exfoliable graphite and expanding these beads via the primary expansion process (b) above; or (g) coating the expanded bead derived from the primary expansion process (b) above with a mixture containing exfoliable graphite and after the maturing process (c) above expanding these using the secondary expansion process into blocks as in (d) above; or (h) coating the matured, expanded beads with a mixture containing exfoliable graphite and expanding these beads using the secondary expansion process into blocks as in (d) above.

In (f), (g) and (h) above the exfoliable graphite is caused to adhere to the bead by incorporating it into a coating mixture of various resinous materials. Additionally, other flame retardants and materials acting as synergists to the flame retardant system may be applied to the polystyrene with the resin and exfoliable graphite mixture.

The exfoliable graphite and resinous material may be compounded together and applied to the EPS bead by tumbling the mixture together in a ribbon blender or any other such low shear mixing device. Preferably, the resinous material should be applied to the surface of the EPS bead as it is tumbled in such a mixer, until the surface is evenly coated, and then the exfoliable graphite sprinkled onto the tumbling mass and allowed to adhere to the surface of the wet EPS bead.

Exfoliable (or otherwise "expandable") graphite consists of native graphite treated with various acids such as sulphuric, nitric or hydrofluoric such that those additions together with water become entrapped between the planes of the graphite crystals at up to 10% of the weight of the final product. When such treated graphites are exposed to heat the entrapped materials are released as gas causing the graphite to expand to up to 250 times its original volume.

The expanded polystyrene beads, modified with the exfoliable graphite as in (e), (f) or (g) above are introduced into the moulds and exposed to the same steam heating cycle as is described in (c) above. As the polystyrene beads expand, soften and adhere together, the graphite and resin mixture becomes incorporated into the EPS block. The graphite is entrapped at the boundary of expansion of each bead, but the resin, flame retardants and synergists tend to be entrapped within the EPS.

Beneficial improvements with respect to reaction to fire performance are obtained from additions of graphite equivalent to one tenth the weight of the expanded polystyrene. However, in order to provide the best reaction to fire performance, or the most stable fire protection, the weight of exfoliable graphite needs to be approximately equivalent to the weight of polystyrene and, hence, doubles the density of the EPS. Given that EPS is used primarily for its thermal insulation properties, the doubling of the SG does not significantly alter the insulation properties of the modified EPS.

When the modified polystyrene produced as above is exposed to heat and fire regimes an entirely different behaviour is observed in comparison with unmodified expanded polystyrene. If exposed directly to a fire regime, the exfoliable graphite activates and intumesces outwards toward the heat source producing a largely inflammable insulating mass protecting the underlying EPS. The character and rigidity of the carbonaceous char can be critically modified by selection of the resin in the resin mixture.

Further, in the presence of the intumescent mass the effectiveness of the additional flame retardant systems appear enhanced in terms of the reduction in the combustion of volatile gases and smoke emission. Under fire conditions unmodified EPS will produce flaming droplets of molten EPS from the fire zone. While conventional flame retardants can cause the flaming droplets to extinguish quite quickly, the methods and procedures revealed in this current invention can eliminate this phenomenon Further, if the expanded polystyrene so modified with exfoliable graphite and selected resins is constructed into composites with fire resistant skins composed of steel, phenolic laminate or ceramic board, then such composite structures will act as thermally insulating barriers, which in the event of a fire regime will act as fire barriers. In this situation the behaviour of the exfoliable graphite modified EPS will be different from its behaviour when exposed directly to flame. Exposed to a fire regime such as that defined in EN 1363, the exfoliable graphite will expand to entirely fill the void between the skins previously occupied by the exfoliable graphite modified EPS with a stable graphitic char mass that will act as a stable insulation capable of a fire protection rating for the composites of up to one hour. If the modified EPS is intended for such fire protection applications then the selection of the grade of exfoliable graphite is critical and its level of incorporation must be selected to entirely fill the residual cavity between the skins of the walling system.

It should be appreciated that the resin binder used will have a significant effect on the physical properties of the exfoliable graphite modified EPS. One aspect of the preferred embodiment of the present invention is the nature of the resin binder system used. It is an advantage of the preferred embodiment that the physical properties of the EPS are either improved or unaltered while gaining the advantages in fire and flame performance. In the preferred embodiment, the resin mixture is applied to the outside of the beads, and appears as a film on the outside of the beads. In the final expansion procedure of the preferred embodiment the beads expand into and through this film and fuse together to form the finished blocks. Hence, the residue of the applied resin film will appear at the cell junctions. Unless the applied resin is compatible with the polystyrene the final block will be weakened.

The compatibility of the binder resins may be determined by consideration of the solubility parameters of the binder resin and the polystyrene. Generally for mutual solubility, the solubility parameter, δ of the two resins must be within 0.5 (cal cm$^{-3}$)$^{1/2}$. In the preferred embodiment of the present invention, the resin latexes used as graphite binders to the beads are styrene/acrylics and/or, polyvinyl chloride/poly vinylidene copolymers and/or styrene homopolymers and/or methylphenyl siloxanes, which may be all applied in emulsion form Another aspect of the preferred embodiment is the incorporation of synergists to the flame retardant system. Brominated flame retardants, particularly hexabromocyclododecane (HBCD), have conventionally, been incorporated into EPS to improve flame retardancy. Metal oxides, preferably of group 6B of the periodic table, may be provided to act as synergists to the flame retardant. Significant further reduction on smoke emission and a reduction of flammability is observed if the metal oxides are added to the mixture applied to the EPS bead with the resin and/or exfoliable graphite system. As in EP 01309918.9 tungsten oxide is the preferred synergist.

Embodiments of the invention will now be disclosed, by way of example only.

All the below examples illustrating the method and effectiveness of the process, use one of the two routines as follows.

A) Application to Freshly Expanded EPS Bead.

Polystyrene bead expanded in the conventional manner from the primary expander, is coated with a mixture of the selected latexes with additional flame retardants and synergist. For convenience, the bead should be taken and treated directly from the primary expander. The manner of application is irrelevant providing that the beads are agitated or stirred so as to properly and completely coat the surface of the bead. A conventional ribbon blender or any apparatus with similarly effective action is suitable. When the bead is fully coated the exfoliable graphite is sprinkled onto the surface of the bead and distributed in a similar manner. The resinous latex will cause the exfoliable graphite to adhere to the surface of the bead. The bead is then allowed to dry and mature as is conventional, preferably in ventilated textile bags. When dry the bead behaves no differently from uncoated bead and therefore may be handled by conventional systems common to the art. The bead is loaded into the block or form moulds, and expanded with steam to form rigid shapes or blocks B) Application to Matured EPS Bead.

Polystyrene bead, expanded in the conventional manner from the primary expander and matured in ventilated textile bags, is coated with a mixture of the selected latexes with additional flame retardants and synergist. When the bead is fully coated the exfoliable graphite is sprinkled onto the surface of the bead and distributed in a similar manner. The bead is then loaded directly into the block moulds. In spite of being wet, the bead behaves in a similar manner to uncoated bead. However, because the bead is wet with the water from the resin emulsion and any additional water used, extended steaming times are required to fully set the block and the EPS blocks so formed require up to 14 days for their weight to stabilise.

Subsequent to either procedure above, the blocks may be cut with hot wire cutters in the same manner as unmodified EPS blocks.

The invention may be illustrated by the following 22 examples, the formulations, procedures and results are shown in tables 1, 2 and 3 below.

The examples were produced in a laboratory block mould 200×200×300 mm simulating the behaviour and construction of full scale production block moulds. Examples 1 to 12 were produced by taking matured bead, coating them with the resin mixtures, flame retardants and synergist as shown, subsequently coating the dampened surface with exfoliable graphite and then expanding them while still wet in the block mould with steam applied to the block mould at 102 to 111° C. at between 1.5 and 2.5 Bar.

Examples 13 to 22 were produced by taking freshly expanded bead, coating them with the resin mixtures, flame retardants and synergist as shown, and subsequently coating the dampened surface with exfoliable graphite. The beads were then matured in textile bags and then expanded dry in the laboratory block mould with steam applied to the block mould at 102 to 111° C. at between 1.5 and 2.5 Bar In the examples styrene acrylic resins are represented by Pliolite LS1 a product of Goodyear Chemicals, polystyrene resins are represented by Emultex 340 a product of Synthomer Ltd, vinyl/vinylidene chloride resins are represented by Haloflex 202 a product of Neoresins BV and phenyl methyl siloxanes are represented by Silikophen P65W a product of Thomas Goldshmidt GmBH.

The additional flame retardant is HBCD (hexabromocylcododecane) but may be any conventional brominated flame retardant. The synergist is tungsten oxide but may be any oxide or combination of oxides from elements of group 6b of the periodic table. It will be noted that example 22 is a control.

The fire protection performance was measured by assembling 200×200×100 mm specimens cut from the blocks made in the laboratory block mould, between 0.8 mm thick plastisol coated steel skins and mounting them as fire barriers in a test furnace capable of reproducing the ISO cellulosic fire curve. The back face temperature of the specimens was monitored to failure temperature of an average of 140° C. above ambient. After firing the cold face of each specimen was removed and the state and condition of the exfoliable graphite char recorded, particularly the ability of the char to fill the cavity previously occupied by the modified EPS.

The reaction to fire performance was measured by assembling two 600×100×50 specimens cut from the blocks made in the laboratory block mould in an apparatus capable of simulating the conditions of the Single Burning Item apparatus (EN 13823). This apparatus has been shown to have a correlation of 0.93 between the Fire Growth Rate Index (FIGRA) it records and the FIGRA as recorded by the full scale apparatus. Therefore, by calculation an indicated Euroclass was calculated.

The measurement of the physical properties was entirely conventional.

It is quite clear from the shown results that with the defined resin types:

(a) providing sufficient exfoliable graphite is present in the formulation to fill the cavity left between the skins of the fire barrier upon ignition excellent fire barriers can be achieved with no loss of low temperature insulation.

(b) excellent reaction to fire properties are achievable for exposed EPS with an improvement in physical properties.

(c) additional conventional flame retardants and their synergists may be advantageously included in the mixtures applied to the EPS.

TABLE 1

Experimental Weight of charges to a 200 × 200 × 300 mm Laboratory Scale Block Mould

| Example No | Condition | EPS Bead | Wt EPS | Wt Graphite | Resin | Wt Resin | Water | HBCD | WO2 |
|---|---|---|---|---|---|---|---|---|---|
| 1 | WAWS | 1420 F | 330 | 330 | Pliolite LS1 | 110 | 110 | | |
| 2 | WAWS | 1420 F | 330 | 330 | Emultex 340 | 110 | 110 | | |
| 3 | WAWS | 1420 F | 330 | 330 | Emultex 340 | 110 | 0 | 3.3 | |
| 4 | WAWS | 1420 F | 330 | 330 | Emultex 340 | 110 | 110 | 3.3 | 3.3 |
| 5 | WAWS | 1420 F | 330 | 330 | Haloflex 202 | 110 | 0 | | |
| 6 | WAWS | 1420 F | 330 | 330 | Haloflex 202 | 110 | 55 | | 3.3 |
| 7 | WAWS | 1420 F | 330 | 330 | Haloflex 202 | 110 | 55 | 3.3 | 3.3 |
| 8 | WAWS | 1420 F | 330 | 330 | Silikophen P65W | 110 | 55 | | |
| 9 | WAWS | 1420 F | 330 | 330 | Silikophen P65W | 110 | 55 | 3.3 | 3.3 |
| 10 | WAWS | 1420 F | 330 | 330 | Haloflex 202 Silikophen P65W | 55 55 | 0 | | |
| 11 | WAWS | 1420 F | 330 | 330 | Haloflex 202 Silikophen P65W | 55 55 | 110 | 3.3 | |
| 12 | WAWS | 1420 F | 330 | 330 | Haloflex 202 Silikophen P65W | 55 55 | 55 | 3.3 | 3.3 |
| 13 | WADS | 1014 F | 330 | 330 | Pliolite LS1 | 110 | 110 | — | |
| 14 | WADS | 1014 F | 330 | 370 | Pliolite LS1 | 110 | 110 | — | |
| 15 | WADS | 1014 F | 330 | 370 | Pliolite LS1 | 110 | 110 | — | |
| 16 | WADS | 1014 F | 330 | 370 | Pliolite LS1 | 110 | 110 | 2.5 | |
| 17 | WADS | 1014 F | 330 | 370 | Haloflex 202 | 110 | 55 | 6 | 3 |
| 18 | WADS | 1014 F | 330 | 370 | Haloflex 202 | 110 | 55 | | |
| 19 | WADS | 1014 F | 330 | 370 | Haloflex 202 | 110 | 55 | 2.5 | |
| 20 | WADS | 1014 F | 330 | 370 | Haloflex 202 | 110 | 55 | 6 | 3 |
| 21 | WADS | 1014 F | 330 | 370 | Haloflex 202 Silikophen P65W | 110 110 | | 6 | 3 |
| 22 | WADS | 1014 F | 330 | — | nil | — | — | — | — |

KEY
WAWS—matured bead, Wet Applied Wet Steamed
WADS—freshly expanded bead, Wet Applied, matured, Dry Streamed

TABLE 2

Examples 1 to 22 formulation weights by percentage

| | % EPS | % Graphite | % Resin Solids | % HBCD | % WO2 | Total |
|---|---|---|---|---|---|---|
| example 1 | 46.88 | 46.88 | 6.25 | 0 | 0 | 100 |
| example 2 | 46.15 | 46.15 | 7.69 | 0 | 0 | 100 |
| example 3 | 45.94 | 45.94 | 7.66 | 0.46 | 0 | 100 |
| example 4 | 45.73 | 45.73 | 7.62 | 0.46 | 0.46 | 100 |
| example 5 | 46.15 | 46.15 | 7.69 | 0 | 0 | 100 |
| example 6 | 45.94 | 45.94 | 7.66 | 0 | 0.46 | 100 |
| example 7 | 45.73 | 45.73 | 7.62 | 0.46 | 0.46 | 100 |
| example 8 | 46.88 | 46.88 | 6.25 | 0 | 0 | 100 |
| example 9 | 46.44 | 46.44 | 6.19 | 0.46 | 0.46 | 100 |
| example 10 | 46.51 | 46.51 | 6.98 | 0 | 0 | 100 |
| example 11 | 46.3 | 46.3 | 6.94 | 0.46 | 0 | 100 |
| example 12 | 46.08 | 46.08 | 6.91 | 0.46 | 0.46 | 100 |
| example 13 | 46.88 | 46.88 | 6.25 | 0 | 0 | 100 |
| example 14 | 44.35 | 49.73 | 5.91 | 0 | 0 | 100 |
| example 15 | 44.35 | 49.73 | 5.91 | 0 | 0 | 100 |
| example 16 | 44.21 | 49.56 | 5.89 | 0.33 | 0 | 100 |
| example 17 | 43.19 | 48.43 | 7.2 | 0.79 | 0.39 | 100 |
| example 18 | 43.71 | 49.01 | 7.28 | 0 | 0 | 100 |
| example 19 | 43.56 | 48.84 | 7.26 | 0.33 | 0 | 100 |
| example 20 | 43.19 | 48.43 | 7.2 | 0.79 | 0.39 | 100 |
| example 21 | 43.19 | 48.43 | 7.2 | 0.79 | 0.39 | 100 |
| example 22 | 100 | | | | | 100 |

TABLE 3

Performance Results for Examples 1 to 22

| | Fire Protection Results | | | | Reaction To Fire Results | | | Physical Properties | | | K Value |
|---|---|---|---|---|---|---|---|---|---|---|---|
| Example | Time to ☐140 Minutes | Temp. at 30 Mins Deg C. | Temp. at 60 Mins Deg C. | % Fill of Cavity | FIGRA (PD) | Calculated FIGRA | Euroclass Estimated | SG | Crush Strength 75% Pascal | 50% Pascal | J $M^{-1}K^{-1}$ $10^2$ |
| example 1 | 39.5 | 118 | | 90 | 41.04 | 4.72 | D | 28 | 11,300 | 18,200 | |
| example 2 | 12.5 | 334 | | 60 | 47.77 | 5.52 | D | 25 | 12,800 | 20,400 | |
| example 3 | 11 | 330 | | 50 | 20.02 | 2.21 | D | 25 | 11,800 | 19,700 | |
| example 4 | 10.5 | 293 | | 35 | 22.69 | 2.53 | D | 31 | 13,200 | 20,400 | |
| example 5 | 13.5 | 239 | | 75 | 20.27 | 2.24 | D | 34 | 11,700 | 17,900 | |
| example 6 | 10 | 312 | | 65 | 32.19 | 3.66 | D | 31 | 14,600 | 22,600 | |
| example 7 | 12 | 223 | | 60 | 23.68 | 2.65 | D | 35 | 13,400 | 21,000 | |
| example 8 | 8 | 369 | | 40 | 6.41 | 0.58 | C | 33 | | | |

TABLE 3-continued

Performance Results for Examples 1 to 22

| | Fire Protection Results | | | | Reaction To Fire Results | | | Physical Properties | | | K Value |
|---|---|---|---|---|---|---|---|---|---|---|---|
| | Time to | Temp. at | Temp. at | | | | | | Crush | | |
| Example | ☐140 Minutes | 30 Mins Deg C. | 60 Mins Deg C. | % Fill of Cavity | FIGRA (PD) | Calculated FIGRA | Euroclass Estimated | SG | Strength 75% Pascal | 50% Pascal | J M$^{-1}$K$^{-1}$ 10$^2$ |
| example 9 | 11.5 | 302 | | 50 | 4.72 | 0.38 | B | 18 | 13,500 | 20,800 | |
| example 10 | 9.5 | 334 | | 70 | 7.2 | 0.68 | C | 38 | 11,200 | 18,200 | |
| example 11 | 13 | 202 | | 75 | 9.64 | 0.97 | C | 32 | 12,100 | 19,600 | |
| example 12 | 9 | 384 | | 25 | 21.05 | 2.33 | D | 33 | 11,100 | 18,200 | |
| example 13 | 33.5 | 149 | 220 | 80 | 45.43 | 5.24 | D | 29 | 18,200 | 24,000 | 39.2 |
| example 14 | >70 | 82 | 141 | 100 | 37 | 4.24 | D | 28 | 13,000 | 25,700 | 48.5 |
| example 15 | 49 | 110 | 173 | 100 | 26.91 | 3.03 | D | 31 | 12,600 | 24,400 | 39.2 |
| example 16 | 29.5 | 162 | 186 | 90 | 41.43 | 4.77 | D | 28 | 16,800 | 31,300 | 43.5 |
| example 17 | 40.5 | 128 | 189 | 85 | 6.68 | 0.61 | C | 33 | 16,800 | 29,400 | 57.3 |
| example 18 | 49 | 117 | 173 | 85 | 38.68 | 4.44 | D | 35 | 16,500 | 27,300 | 42.7 |
| example 19 | 58 | 101 | 162 | 90 | 22.8 | 2.54 | D | 31 | 11,900 | 24,700 | 39.2 |
| example 20 | >70 | 80.3 | 143 | 95 | 4.69 | 0.38 | B | 35 | 12,700 | 25,400 | 42.1 |
| example 21 | >70 | 83.8 | 121 | 95 | 3.4 | 0.22 | B | 35 | 14,000 | 25,100 | 33 |
| example 22 | 7 | 418 | 519 | 0 | 111.39 | 13.13 | E | 17 | 10,000 | 22,900 | 30.3 |

The invention claimed is:

1. A composition for forming a fire resistant material comprising a plurality of expandable beads of a polymeric material, wherein the polymeric material comprises polystyrene, said beads being coated with an exfoliable graphite, characterised in that the exfoliable graphite is adhered to the beads with a resin comprising an emulsion comprising a styrene homopolymer, the resin having a solubility parameter of within substantially 0.5 (cal cm$^{-3}$)$^{1/2}$ of the solubility parameter of the polymeric material.

2. A composition according to claim 1 characterised in that the resin comprises an emulsion further comprising one or more of a styrene/acrylic copolymer, a vinylidene vinyl chloride copolymer, and methylphenyl siloxane.

3. A composition according to claim 1 characterised in that the resin includes a halogenated flame retardant.

4. A composition according to claim 3 characterised in that the resin includes a synergist comprising an oxide of an element of Group 6B of the Periodic Table.

5. A composition according to claim 3 characterised in that the halogenated flame retardant comprises a brominated flame retardant.

6. A composition according to claim 3 characterised in that the flame retardant comprises hexabromocyclododecane.

7. A composition according to claim 4 characterised in that the synergist comprises tungsten oxide.

8. A composition according to claim 4 characterised in that the synergist comprises yellow tungsten oxide.

9. A composition according to claim 1 characterised in that the expandable beads comprise partially expanded polystyrene beads.

10. A fire resistant material comprising a composition according to claim 1 wherein the beads have been allowed to expand and fuse together.

11. A fire carrier formed of a fire resistant material according to claim 10 arranged between non-flammable outer skins where the fire resistant material contains sufficient exfoilable graphite substantially to fill the cavity between the skins on expansion thereof after melting and loss of within substantially 0.5 (cal cm$^{-3}$)$^{1/2}$ of the polymeric material in a fire situation.

12. A method of forming a fire resistant material comprising:

providing partially expanded polystyrene beads;

coating the partially expanded polystyrene beads with exfoliable graphite using, as an adhesive, a resin comprising an emulsion comprising a styrene homopolymer, the resin having a solubility parameter of within substantially 0.5 (cal cm$^{-3}$)$^{1/2}$ of the solubility parameter of the polystyrene beads; and forming the coated partially expanded polystyrene beads into blocks by a final expansion in closed form using steam.

* * * * *